May 28, 1968 L. F. MIKLOS 3,385,154

SHEET METAL FASTENER

Filed Dec. 12, 1966

INVENTOR.
LOUIS F. MIKLOS
BY Walter Lenca
ATTORNEY

United States Patent Office 3,385,154
Patented May 28, 1968

3,385,154
SHEET METAL FASTENER
Louis F. Miklos, Lake County, Ind.
(6151 Delaware St., Gary, Ind. 46409)
Filed Dec. 12, 1966, Ser. No. 600,851
3 Claims. (Cl. 85—10)

ABSTRACT OF THE DISCLOSURE

A nail device for connecting sheet metal being formed with a tapered end having a circular base which is larger in diameter than that of the cylindrical shank portion so as to provide a radially projecting shoulder therearound. A coat of elastomeric plastic is bonded to the shank and the overall diameter of the plastic coated shank is coextensive to slightly larger than that of the circular base of the tapered end. Upon piercing insertion of the nail device through the sheet metal, the ruptured edges thereof will become imbedded in the elastic plastic coat on the shank to effectively fasten the sheet metal to the nail device of this invention.

This invention relates generally to fastening devices and more particularly to a nail device for fastening together metal sheets.

A conventional method of fastening and supporting metal sheets together to form a wall surface includes the steps of overlapping the edges of metal sheets and driving nails therethrough and a structural member such as a stud or purlin member backing the metal sheets. If the sheet metal material forming a wall surface is supported on a metal framework, holes must be made therethrough for receiving screws and the assembly is fastened by tightening a nut on each of the threaded screw shanks. Another conventional method of securing metal sheets together includes the employment of self-tapping screws which utilize the annular edge of a pierced hole for threadily engaging the screw. Rivets are also used as fasteners for which holes are made in the sheet metal and the rivet ends are expanded to secure the sheet metal together.

In each of the methods of the prior art, a major disadvantage involves the problem of leakage through these holes in the sheet metal due to the fact that the sheet metal, being exposed to changing climatic conditions, expand and contract. These expansion and contraction movements cause the sheet metal to act against the anchored fastening elements, causing deformation and enlargement of the holes. The resulting enlargement of the clearance between the sheet metal and the conventional fastening elements supporting the sheet metal frequently results in water leakage therebetween. Leakage through such worn and deformed holes are conventionally remedied by removing the fastener elements therein and enlarging the holes to form round holes to fittingly receive larger fastener elements to provide a tight connection therebetween. However, within a period of time, the continued action of contraction and expansion of the sheet metal, cause the holes to again deform and enlarge, again loosening the connection between the fasteners and the metal sheets with the consequent leakage therethrough. This method of remedial repair is obviously limited and costly.

Another disadvantage of the prior art practice of securing sheet metal by bolt, screw or rivet means is the additional time required for preparing a hole to receive each of the fastener elements and the resultant high cost of construction. Self-tapping screws are subject to the additional disadvantage of loosening by unscrewing action due to vibration and other movement of the sheet metal.

Therefore, in order to overcome the above disadvantages of the prior art, I have provided a nail type fastener having a coat of elastomeric plastic material on the shank, and a pointed end formed with a circular base which is larger in diameter than that of the shank to provide a radially projecting shoulder therearound against which the elastomeric plastic coat abuts and is protected thereby during piercing insertion thereof through a metal sheet. The overall diameter of the coated shank is approximately coextensive to slightly larger than the circular base of the pointed end so that upon piercing insertion through the metal sheet, the ruptured edges thereof will become imbedded in the elastic coat on the shank to effectively fasten together the metal sheet and the nail device of my invention.

An object of my invention is to provide a driven type fastening element which is economical to manufacture and simple to use to tightly secure metal sheets together.

Another object of my invention is to provide a fastening element adapted for driving through metal sheets and to accomplish the connection therebetween against the shank and the head of the fastener element which flexible cushions the movement of the sheet metal.

Still another object of my invention is to provide a driven type fastening element for sheet metal which is tamper proof in that its novel connection hold prevents removal thereof.

These and other objects and advantages of this invention will become apparent after a more careful study of the following detailed description taken together with the drawings in which.

Figure 1:
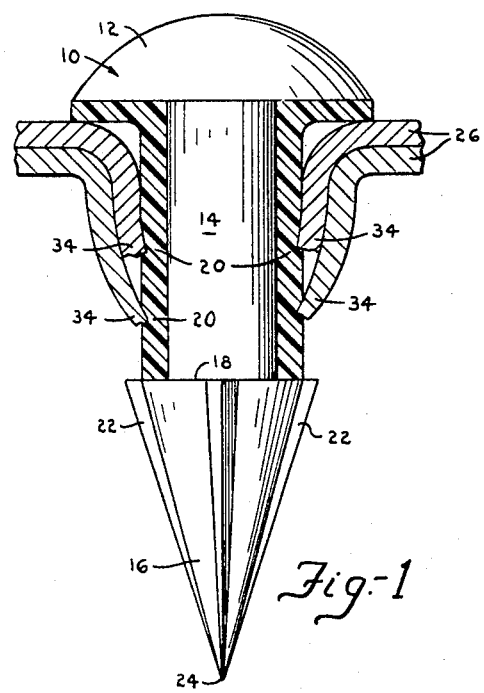
FIGURE 1 is a side elevation of my invention showing the fastening element in operative relation with the overlapping metal sheets, which are shown partly in section.
Figure 2:
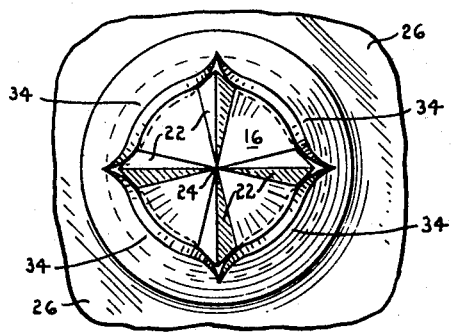
FIGURE 2 is a bottom view of the connection assembly of the fastening element of this invention and the sheet metal as shown in FIGURE 1.

Referring now to the drawing, particularly FIGURES 1 and 2, numeral 10 designates generally the preferred form of the fastening nail of my invention. It comprises a head 12, a longitudinal shank 14, and a tapered end 16. Tapered end 16 is conical in section and the base 18 thereof is circular and diametrally larger than cylindrical shank 14. Bonded to shank 14, circumferentially therearound and the length thereof, is a flexible plastic coat 20 which has the toughness and durability of hard rubber or other synthetic elastomer plastics such as those commercially known as Teflon and Tygon. I have found that for optimal results in flexibility and holding power, the overall sectional diameter of shank 14 and the plastic coat 20 should be within the range of 1/64 inch larger than the base 18 of tapered end 16 for a base 18 having a diameter of 1/8 inch; to 1/16 inch larger than the base 18 of tapered end 16 having a diameter of 1/4 inch. Spaced circumferentially around end 16 are a plurality of radially protruding fluting edges 22 taperingly extending the length of end 16 and terminating with a piercing point 24.

Figure 3:
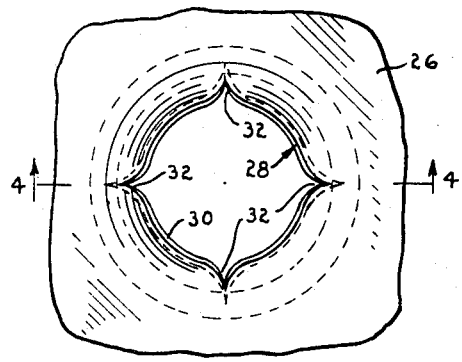
FIGURE 3 is an enlarged plan elevation of the hole in the sheet metal made by the fastening element of this invention.
Figure 6:
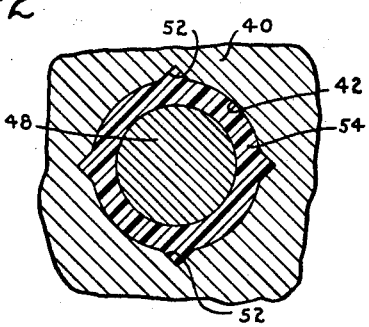
FIGURE 6 is a plan elevation of the connected assembly of FIGURE 5 taken along lines 6—6 of FIGURE 5.
Figure 4:
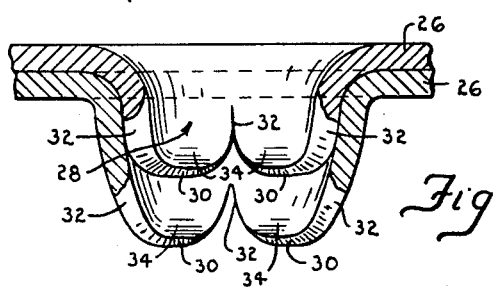
FIGURE 4 is a sectioned side elevation of the sheet metal material taken along line 4—4 of FIGURE 3 showing the cantilever sections of the annular edge of the hole.

The fastening nail 10 of my invention is hammer driven into sheet metal 26 with a single blow in the conventional manner. The resulting aperture 28 obtained is shown in FIGURES 3 and 4. Radially protruding edges 22 of end 16 of nail 10 serve to radially rupture the annular edge 30 of aperture 28 as at 32 to provide a plurality of flexibly movable sheet metal sections 34 so that edge 30 will no longer deformably stretch but will bend and retain a resilient bias as the tapered end 16 passes through the flexibly enlarging hole 28 until base 18 passes therethrough, whereupon sheet metal sections 34 will flexibly return to the extent allowable by plastic coat 20. As nail 10 is driven completely through hole 28 of sheet metal 26, so that head 12 abuts against sheet metal 26, with the impact of the driven blow, annular edge 30 of flexibly movable sheet metal sections 34 will become imbedded in the material of plastic coat 20. This action will serve to effectively connect nail 10 to sheet metal 26. The resultant connection therebetween obtained is secure against intentional removal of nail 10 or loosening thereof by vibration or other movements of sheet metal 26 with the resultant leakage therethrough.

Figure 5:
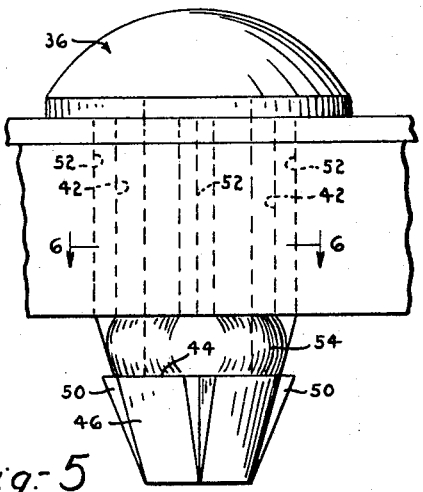
FIGURE 5 is a side elevation of a slightly modified fastening element of my invention in operative relation with a structural member and overlapping sheet metal, shown partly in section.

FIGURE 5 illustrates the application of a nail 36 of my invention for connecting an overlapping sheet metal 38 to a structural member 40. For such connective assembly, a hole 42 is drilled having a diameter size slightly larger than the diameter of base 44 of the truncated conical end 46, and less than the overall diameter of the plastic coated shank 48 and the radially extending fluting edges 50 circumferentially around conical end 46. When nail 36 is driven through hole 42 in sheet metal 38 and structural member 40 to connectingly support the sheet metal to the structural member, the plurality of fluting edges 50 on conical end 46, having a diametral dimension which is larger than the diameter of hole 42, will cause longitudinal grooves 52 to be scored in the annular surface of hole 42 in sheet metal 38 and structural member 40. Since the diameter of the plastic coated shank 48 is larger than hole 42, the plastic material 54 thereof being circumferentially compressed therearound will flow in longitudinal grooves 52 and radially expand between base 44 of conical end 46 and structural member 40, thereby tightly connecting and securing nail 36 to sheet metal 38 and structural member 40.

Having thus described my invention, it is apparent that modifications may be made therein without departing from the spirit of my invention. Accordingly, what I claim is:

1. A nail device for connecting sheet metal wherein the material of said nail is sufficiently hard to penetrate the material of said sheet metal comprising:

a head, a cylindrical shank and a tapered end;
said tapered end having a circular base adjacent said cylindrical shank,
  said circular base being diametrically larger than said cylindrical shank;
an elastomer plastic coat on said cylindrical shank radially extensive of said circular base of said tapered end; and
a plurality of radially extending fluting edges circumferentially spaced around said tapered end.

2. The nail device of claim 1 wherein said plurality of said radially extending edges taper from said circular base to coterminate with the distal end of said tapered end.

3. A nail device for connecting sheet metal wherein the material of said nail is sufficiently hard to penetrate the material of said sheet metal comprising:

a head, a cylindrical shank, and a tapered end;
said tapered end having a circular base adjacent said cylindrical shank,
  said circular base of said tapered end being greater in diameter than that of said cylindrical shank;
a coating of elastomeric plastic material on said cylindrical shank of said nail;
said coated cylindrical shank having a diameter larger than the diameter of said circular base of said tapered end by approximately 1% to 7% for said circular bases ranging in diameter from approximately ⅛ inch to ¼ inch; and
a plurality of radially projecting and longitudinally extending edges spaced circumferentially around said tapered end.

References Cited

UNITED STATES PATENTS 1,260,154  3/1918  Day _____ 85—41

FOREIGN PATENTS 247,297  9/1963  Australia.
865,200  4/1961  Great Britain.

EDWARD C. ALLEN, *Primary Examiner.*

CARL W. TOMLIN, *Examiner.*

R. S. BRITTS, *Assistant Examiner.*